Patented Dec. 14, 1948

2,456,069

UNITED STATES PATENT OFFICE 2,456,069

ADJUSTING THE pH OF SYNTHETIC ELASTOMER LATICES

Herbert K. Livingston, Wilmington, Del., assignor to E. I. du Pont de Nemours & Company, Wilmington, Del., a corporation of Delaware No Drawing. Application August 29, 1945, Serial No. 613,447

5 Claims. (Cl. 260—29.7)

This invention relates to the preparation of synthetic elastomer latices, and, more particularly, to a method for producing and maintaining a high pH in latices of synthetic elastomers of the butadiene and chloroprene type.

It is frequently desirable to employ synthetic latices which have pH values in the range 11.7 to 12.7 because they have better mechanical stability and can be compounded more readily than the less alkaline latices. It has also been found that latices of synthetic elastomers, particularly polychloroprene, often become considerably less alkaline on storage, apparently due to a slight oxidation of the polymers with the formation of acids, and it is therefore advantageous to provide latices which will still have the desired alkalinity after long periods of storage. This can sometimes be brought about by adding a strong inorganic base, such as sodium hydroxide, to bring the pH up to the desired value, and, if storage stability is considered, adding enough more to form an alkaline reserve designed to react with the acids formed on storage and still to produce the desired pH at the end of the estimated storage period. It has been found, however, that strong inorganic bases cannot be added, except as very dilute solutions, to latices in which the dispersing agent is of the anionic type, without causing coagulation or flocculation. These anionic agents, that is, those in which the activity resides in the negative or anionic part of the molecule, are the principal types used in this field, and include ordinary soaps, long chain sulfates, long chain sulfonates, and naphthalene sulfonates. The use of caustic dilute enough to avoid flocculation is usually impractical because of the serious dilution of the latex which results. Weaker bases, such as ammonia, do not cause the desired increase in pH when used in practical amounts. It is sometimes possible to add the caustic before the polymerization step in the preparation of the latex, but, when enough alkali is added to form a reserve which will prevent the pH from falling below a certain minimum on storage, several highly undesirable things may happen, such as reduction of polymerization rate, increase of viscosity of the polymerizing dispersion and flocculation. Furthermore, the amount of alkali which must be added in order to have the desired pH after storage often gives an undesirably high pH initially. Diethanolamine has been used for this purpose, but, as shown hereinafter in Examples 1 and 2, it does not maintain the desired pH over long periods of storage.

It is therefore an object of this invention to provide a process for producing and maintaining a pH of from 11.7 to 12.7 in synthetic elastomer latices of the type in which the principal dispersing or stabilizing agent is of the anionic type.

A further object of the invention is to provide a process for producing and maintaining a high pH of from 11.7 to 12.7 in elastomer latices which does not cause flocculation, coagulation or excessive dilution of the latex.

I have found that a pH of from 11.7 to 12.7 in synthetic elastomer latices of the butadiene and chloroprene types can be obtained without flocculation, coagulation or excessive dilution of the latex by incorporating in the synthetic elastomer latex a tetraalkanolammonium hydroxide containing 12 or less carbon atoms, but in which none of the alkanol groups contain more than 5 carbon atoms. This class of compounds may be represented by the formula:

$$(HOC_xH_{2x})_4NOH$$

in which $x$ may be different in each of the $(HOC_xH_{2x})$ groups but is in every case an integer with a value from 2 to 5 ($x=2$ is preferred) and in which the total number of carbon atoms is not greater than 12.

As will be illustrated by the following examples, this class of tetraalkanolammonium hydroxides are strongly alkaline and will produce or maintain a pH of 11.7 to 12.7 in synthetic elastomer latices, but, unlike the strongly alkaline inorganic bases, they do not coagulate or flocculate the latices, even when added as 30%, 40% or sometimes even as 60% solutions.

The varied embodiments of this invention are illustrated in the following examples. The parts used in the examples, unless otherwise specified, are parts by weight. The processes of the following examples were performed at room temperature, and the pH measurements were made using the glass electrode, according to the method described by Jordan, Brass and Roe (Ind. Eng. Chem., anal. ed., 9, 182, 1937). The special electrode which exhibits very small alkaline errors in pH ranges above 9.5 (described by Dole, "The Glass Electrode," John Wiley & Sons, New York, 1941, pages 132-5) was used in all cases.

LATEX A

A neoprene latex was made by emulsifying 100 parts of chloroprene, which contained 4 parts of rosin and 0.25 part of sulfur, in 94 parts of water which contained 1.05 parts of sodium hydroxide (with the formation of sodium abietate as the dispersing agent) and 0.2 part of potassium persulfate and allowing the emulsion to polymerize at 40° C. in a nitrogen atmosphere (polymerization in absence of oxygen is claimed in Wilder application, Serial No. 464,081, filed October 31, 1942, now U. S. Patent 2,394,347). During the polymerization, 0.2 part of potassium ferricyanide (potassium ferricyanide catalysis is claimed in Youker application, Serial No. 455,219, filed May 30, 1942, now U. S. Patent 2,417,034) in 2 parts of water was added in several portions. The polymerization was allowed to proceed to approximately 95% completion, yielding a polychloroprene latex containing 50% solids and with a pH of 12.3.

Example 1

Latex A was divided into three portions. To the first portion, one-half part of tetraethanolammonium hydroxide dissolved in one part of water was added for each 100 parts of latex. To the second portion, one-half part of diethanolamine dissolved in 1½ parts of water was added for each 100 parts of latex. The third portion of the latex was not treated. The three samples were then stored at 50° C. for 37 days. At the end of this time, the pH values were measured on the samples, with the following results:

| Portion treated with— | Original pH | pH after storage |
|---|---|---|
| Tetraethanolammonium hydroxide | 12.31 | 11.92 |
| Diethanolamine | 12.30 | 11.02 |
| Nothing | 12.30 | 10.29 |

It was also observed that solutions of potassium hydroxide or sodium hydroxide containing over 5 parts of alkali per 100 parts of water flocculated this neoprene latex.

The above data show that tetraethanolammonium hydroxide maintained the pH in the useful range, even after storage at elevated temperatures for a considerable time, while the pH of the other samples dropped sharply. This was true even though the amount of alkali neutralized during aging of the above three samples (due to the decomposition of the polychloroprene with the formation of acidic materials) was approximately the same in every case.

Example 2

A series of polychloroprene latices was made according to the procedure described in connection with Latex A, except that the number of parts of sodium hydroxide was varied. It was observed that the latex made with the greatest amount of sodium hydroxide contained some fine flocculation which, on standing, would come to the surface of the latex and form lumps. But the latices made with less than this amount of sodium hydroxide were smooth and did not have this objectionable feature. Each of these latices was divided into two parts, one of which was treated with one-half part of tetraethanolammonium hydroxide dissolved in one and one-half parts of water for each 100 parts of latex, and the other with one-half part diethanolamine dissolved in 1½ parts of water for each 100 parts of latex. The latices were then stored at room temperature and the pH's determined after storage, with the results given below:

| Parts NaOH per 100 parts chloroprene | Compound Added¹ | Initial pH | pH after 4 weeks | pH after 8 weeks | pH after 18 weeks |
|---|---|---|---|---|---|
| 1.06 | DEA | 12.5 | 12.3 | 12.2 | 10.9 |
| 1.06 | TEAH | 12.5 | 12.4 | 12.3 | 12.2 |
| 0.95 | DEA | 12.3 | 11.7 | 10.8 | 10.7 |
| 0.95 | TEAH | 12.4 | 12.3 | 12.2 | 12.0 |
| 0.90 | DEA | 12.3 | 10.6 | | 9.9 |
| 0.90 | TEAH | 12.3 | 12.2 | | 11.5 |

¹ DEA=diethanolamine; TEAH=tetraethanolammonium hydroxide.

It can be seen that tetraethanolammonium hydroxide makes even the sample with the least sodium hydroxide superior to the most alkaline diethanolamine-treated sample in retention of pH. The alkaline reserve furnished by tetraethanolammonium hydroxide in all cases prevented marked changes in pH and gave the latex improved stability in this respect. It was thereby possible to polymerize a latex at lower alkalinity, with less tendency toward floc-formation, and, after polymerization, increase the alkaline reserve to such a value as to give good retention of pH on aging, all without diluting the latex appreciably or flocculating it. Inorganic bases flocculated all these latices unless added as very dilute solutions.

Example 3

One hundred (100) parts of Latex A was treated with one-half part of diethanolamine dissolved in three-fourths part of water. The latex was then stored for 103 days at ordinary room temperatures. At the end of this period, the pH was 10.5. When two-thirds part of tetraethanolammonium hydroxide dissolved in 1⅔ parts of water was added to this latex, the pH was raised to 12.2. To this latex was added 15 parts of a pigment dispersion composed of 90 parts of clay, 45 parts of zinc oxide, 18 parts of phenyl-beta-naphthylamine, 4.5 parts of ammoniated casein, 1.5 parts of the sodium salt of a condensation product of formaldehyde and a naphthalene sulfonic acid, and 147 parts of water. After this treatment the latex, which remained perfectly smooth, contained all the necessary compounding ingredients for the production of polychloroprene articles by any standard process, the pigments remaining uniformly dispersed throughout the articles so made.

Another portion of this same latex which had been aged for 103 days was not treated with tetraethanolammonium hydroxide but, instead, was allowed to remain at a pH of 10.5.

When the above-mentioned pigment dispersion was added, the dispersed compounding ingredients were coagulated and flocculated so that a non-uniform mix resulted from which it was impossible to make polychloroprene articles of any value, because the compounding ingredients were not uniformly dispersed throughout the article. On the other hand, the latex before aging, when it had a pH of 12.3, could be mixed with this pigment dispersion without difficulty. Thus, it is shown that an aged latex can be restored to its original utility by use of the methods of the present invention.

Furthermore, if the amount of tetraethanolammonium hydroxide was 1⅓ parts (dissolved in 2⅔ parts of water) added for each 100 parts of Latex A, the pH was restored to its original value of 12.3, and this was accomplished with a very little dilution of the latex. In fact, the total solids content of the latex, as determined by drying at 120° C., was reduced only from 50% to 49% in the process of restoring the pH to its original value.

The concentration of the tetraethanolammonium hydroxide solution which was used corresponded to 0.24 mol of base in 100 grams of water. When either sodium hydroxide or potassium hydroxide was added to this latex in concentrations of 0.24 mol of base per 100 grams of water, the latex was flocculated.

Latex B

A solution of 0.3 part of sodium hydroxide, 0.4 part of potassium persulfate, 0.4 part of the sodium salt of a condensation product of formaldehyde and naphthalene sulfonic acid, 0.06 part of potassium ferricyanide (potassium ferricyanide catalysis is claimed in Youker application Serial No. 445,219 filed May 30, 1942), and 2.8 parts of the mixture of salts of long-chain fatty carboxylic acids used in GR-S polymerization and commonly known as Rubber Reserve Corporation soap, all dissolved in 60 parts of water, was introduced into a long, narrow tube and chilled. Ten parts of styrene, 0.2 part mixed long-chain alkyl mercaptans with average chain length corresponding to lauryl mercaptan, and 30 parts of butadiene were then added. The tubes were sealed, warmed to 50° C. in a water bath, and rotated end-over-end for 20 hours. At the end of this time, the polymerization was substantially complete and the product, a 40% Buna S latex, was removed from the tube.

*Example 4*

Latex B, which was only weakly alkaline, was treated with various bases in an attempt to increase the alkalinity. A sodium hydroxide solution containing 3 grams (.075 mol) in 100 grams of water, or a potassium hydroxide solution containing 8 grams (.14 mol) in 100 grams of water, could not be added to the latex without severe flocculation, but the alkali content could be increased without flocculation and with very little dilution by the addition of a tetraethanolammonium hydroxide solution containing 66 grams (.31 mol) in 100 grams of water. This is the highest concentration at which tetraethanolammonium hydroxide is commercially available at present. Undoubtedly, higher concentrations could have been used with this latex without difficulty.

*Example 5*

The latex marketed by the Rubber Reserve Corporation as "GR-S Latex Type No. 3" is described (India Rubber World, vol. 109, p. 577) as "a 50–50 butadiene; styrene ratio copolymer emulsified in potassium rosinate." The sample used in the following experiment had been concentrated by evaporation to 60% total solids.

The GR-S Latex Type No. 3 described above, which had a pH of 10.9, was treated with alkalies as in Example 3. A sodium hydroxide solution containing 3 grams (.075 mol) in 100 grams of water, or a potassium hydroxide solution containing 7.5 grams (.125 mol) in 100 grams of water, could not be added to this latex, but the alkali content could be increased without flocculation by the addition of a tetraethanolammonium hydroxide solution containing 47 grams (0.22 mol) in 100 grams of water. Four parts of this solution increased the pH of 50 parts of latex to 11.7.

LATEX C

A neoprene latex was made by emulsifying 100 parts of chloroprene which contained 0.25 part of sulfur, in 96 parts of water which contained 4 parts of "Daxad-11AM," an emulsifying agent described as the ammonium salt of the formaldehyde-naphthalene sulfonic acid condensation product made according to U. S. Patent 2,046,757. The emulsion was allowed to polymerize at 40° C., and after two hours polymerization was approximately 97% complete, yielding a 50% neoprene latex.

*Example 6*

Latex C, after several weeks' aging, had a pH of 1.30. It was found that a mixture of one part of tetraethanolammonium hydroxide and 2 parts of water was very effective in increasing the pH. Solutions of sodium hydroxide would also increase the pH, but even a solution of one part of sodium hydroxide per 20 parts of water was concentrated enough to flocculate the latex. The following pH measurements were made:

| Alkaline Substance Added | Parts Water per Part of Alkaline Substance | Pts. Soln. per 100 pts. Latex | pH of Latex |
|---|---|---|---|
| None | | | 1.3 |
| Tetraethanolammonium hydroxide | 2 | 11 | 9.4 |
| | | 22 | 11.4 |
| NaOH | 20 | 11 | 8.8 |
| | | 22 | 10.7 |

It was observed that the pH increase was rapid when tetraethanolammonium hydroxide was added, but was very slow when sodium hydroxide was used. This slowness was probably due to the sodium hydroxide becoming bound in the flocs which formed, and slowly diffusing out. Obviously, sodium hydroxide was not satisfactory for increasing the pH.

LATEX D

A neoprene latex was made by emulsifying 100 parts of chloroprene, which contained 0.25 part of sulfur and 2 parts of cyclohexanol, in 96 parts of water which contained 2.2 parts of technical grade sodium octyl sulfate. The emulsion was allowed to polymerize at 40° C. for 10 hours, during which time the polymerization proceeded to a high yield. Two parts of diethanolamine dissolved in 2 parts of water was then added to the latex. The product was a 50% neoprene latex.

*Example 7*

After several years' aging, Latex D had a pH of 5.2. The addition of 3.3 parts of a mixture of one part of tetraethanolammonium hydroxide and 2 parts of water to 100 parts of latex increased the pH to 9.0, and another 8.8 parts of the mixture increased the pH further to 11.2. The latex remained perfectly smooth throughout this treatment.

The above-mentioned mixture contained 0.24 mol of tetraethanolammonium hydroxide per 100 grams of water. An attempt was made to increase the pH of Latex D using sodium hydroxide at half this molar concentration (0.12 mol or 4.8 grams per 100 grams of water), but on the addition of sufficient solution to raise the pH to 9 or higher, the latex was locally coagulated, with the formation of a large lump of coagulum. This latex was then of no value for any further operations, since it was rough, partially coagulated, and destabilized.

Although, in the preceding examples, the tetraethanolammonium hydroxide was added to the latex at 20° to 30° C., higher or lower temperatures may be used. Other tetraalkanolammonium hydroxides may be used, such as tetrapropanolammonium hydroxide, tetraisopropanolammonium hydroxide, or mixed types. It is important that none of the alkanol groups be of the long-chain type, for such compounds, containing 6 carbon atoms or more in one chain, are generally coagulating agents for latices of the type in which the principal dispersing agent is of the anion active class.

The agents for increasing pH need not be added separately. They can be combined with the dispersions of vulcanizing agents, colors, fillers, accelerators, or solutions of accelerators or stabilizing agents, if it is desired to add them while compounding the latex. On the other hand, these agents can be added before compounding, for example, before the latex is shipped from the factory where it is made. They may also be added to restore the high pH of latices which have lost pH on storage.

The synthetic elastomers in the latices to be treated may be polymers of butadiene, chloroprene, fluoroprene, or other haloprenes or the interpolymers of any of these with each other or with interpolymerizable vinyl compounds such as styrene or acrylic or methacrylic esters or nitriles.

The dispersing agents in the latices (i. e., the emulsifying agents used in emulsifying the abovementioned dienes and vinyl compounds prior to emulsion polymerization and in stabilizing the dispersions) may be the soluble salts of high-molecular weight carboxylic or sulfonic acids or the sulfates of long-chain alcohols, or the free acids, when they are water soluble or other long-chain or polynuclear surface active compounds in which the anionic portion of the molecule is the surface-active group. Examples of such dispersing agents are the sodium, potassium or ammonium salts of stearic, oleic, lauric or other long-chain aliphatic acids, or sodium or potassium salts of carboxylic acids with hydrogenated polycyclic nuclei, such as the salts of abietic acid or other rosin acids. Other examples are aromatic sulfonic acids and their salts, such as the sodium or ammonium salts of the surface-active sulfonic acids described in U. S. Patent 2,046,757, or aliphatic sulfonic acids and their salts, made, for example, by the process described in U. S. Patent 2,046,090 (Reissue 20,968), or long-chain alkyl sulfuric acids and their salts, such as those described in U. S. Patent 1,968,794.

An important advantage of this invention is in its use in concentrated latices, such as those with 50% to 65% solids content, made by creaming, centrifuging, or evaporating latex with lower solids content, or by polymerizing emulsions containing 50% or more of polymerizable monomers. However, the process can also be applied without difficulty to latices with 40%, 30% or less solids content.

The tetraalkanolammonium hydroxide to be used need not be pure; commercial grade material can be used so long as none of the impurities have a deleterious effect on the latex.

Whenever it is desirable that synthetic latices, in which the principal stabilizing or dispersing agent is of the anion-active type, exhibit the maximum possible stability upon storage, mechanical agitation, or the addition of dispersed compounding ingredients, it will usually be found that an improved stability can be realized by increasing the pH of the latex, for example into the range 11.7 to 12.7. This pH can be produced and maintained by the methods of the present invention more easily and with less harmful effects on the latex than by methods heretofore known.

It should be realized that there are some processes, generally those involving coagulation or gelation with acids or acidic materials, in which a high pH at the time of coagulating or gelling is undesirable. However, in these cases it is frequently advantageous to use a latex which has a high pH during storage or compounding. It is then possible by the methods disclosed in my copending application, Serial No. 523,935, now abandoned, to employ a latex with a high pH and then reduce the pH just before gelling or coagulating by adding an amino acid.

Another advantage of the present invention is that the tetraalkanolammonium hydroxides are safe to use with latex, because, even at high concentrations, they have relatively little flocculating action. On the other hand, the inorganic bases must be handled with care, for, if through errors in measuring or poor mixing the concentration of the aqueous solutions is slightly higher than was intended, the latex may be harmed. Furthermore, large amounts of inorganic base may give an excessively high pH, while the tetraalkanolammonium hydroxides are not likely to carry the pH much above 12.7.

I claim:

1. In the process for producing and maintaining a pH of from 11.7 to 12.7 in synthetic elastomer latices of the class consisting of polychloroprene latices and 1,3-butadiene elastomer latices in which the principal dispersing and stabilizing agent is of the anionic type, the step which comprises incorporating in the latex a tetraalkanolammonium hydroxide of the formula:

$$(HOC_xH_{2x})_4NOH$$ 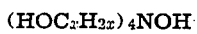

in which $x$ is one of the integers 2 and 3 and in each case is the same.

2. In the process for producing and maintaining a pH of from 11.7 to 12.7 in synthetic elastomer latices of the class consisting of polychloroprene latices and 1,3-butadiene elastomer latices in which the principal dispersing and stabilizing agent is of the anionic type, the step which comprises incorporating in the latex tetraethanolammonium hydroxide.

3. In the process for producing and maintaining a pH of from 11.7 to 12.7 in a polychloroprene latex in which the principal dispersing and stabilizing agent is of the anionic type, the step which comprises incorporating in the latex a tetraalkanolammonium hydroxide of the formula:

$$(HOC_xH_{2x})_4NOH$$ 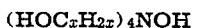

in which $x$ is one of the integers 2 and 3 and in each case is the same.

4. In the process for producing and maintaining a pH of from 11.7 to 12.7 in a polychloroprene latex in which the principal dispersing and stabilizing agent is of the anionic type, the step which comprises incorporating in the latex tetraethanolammonium hydroxide.

5. In the process for producing and maintaining a pH of from 11.7 to 12.7 in a butadiene-styrene elastomer latex in which the principal dispersing and stabilizing agent is of the anionic type, the step which comprises incorporating in the latex tetraethanolammonium hydroxide.

HERBERT K. LIVINGSTON.

REFERENCES CITED

The following references are of record in the file of this patent:

UNITED STATES PATENTS

| Number | Name | Date |
|---|---|---|
| 2,378,619 | Carswell | June 19, 1945 |